United States Patent [19]
Carroll

[11] Patent Number: 6,159,366
[45] Date of Patent: Dec. 12, 2000

[54] NO SPILL, SELF-BLEEDING FILTER

[76] Inventor: Randall Scott Carroll, 660 N. Main St., Manchester, Conn. 06040

[21] Appl. No.: 09/134,766

[22] Filed: Aug. 12, 1998

Related U.S. Application Data

[60] Provisional application No. 60/056,492, Aug. 21, 1997.
[51] Int. Cl.[7] .................. B01D 35/14; B01D 35/153; B01D 35/31
[52] U.S. Cl. .................. 210/172; 210/248; 210/436; 210/444
[58] Field of Search .................. 210/172, 248, 210/436, 472, 444

[56] References Cited

U.S. PATENT DOCUMENTS

| | | |
|---|---|---|
| 991,212 | 5/1911 | Kincaid . |
| 2,979,208 | 4/1961 | Humbert . |
| 3,023,906 | 3/1962 | Moore . |
| 3,931,015 | 1/1976 | Jenkins . |
| 4,253,959 | 3/1981 | Tafara . |
| 4,390,425 | 6/1983 | Tafara . |
| 5,382,360 | 1/1995 | Vosper . |
| 5,711,876 | 1/1998 | Lee . |

FOREIGN PATENT DOCUMENTS 743400  9/1966  Canada .

*Primary Examiner*—Thomas M. Lithgow

[57] ABSTRACT

Disclosed is a filter assembly having a top piece and a bottom filter canister for receiving a filter element. The top piece includes inlet and outlet passages and is shaped to plunge into the bottom canister when the canister is joined to the top piece and take up space such that when the canister separated from the top piece, the liquid or fuel level in the canister stays below the top, preventing spilling of the liquid. Th inlet passage of the top piece can be angled upward, such that almost all of the air in the canister can be quickly bled back into a fuel tank holding the fuel to be filtered by the filter assembly.

12 Claims, 2 Drawing Sheets

NO SPILL, SELF-BLEEDING FILTER

CROSS-REFERENCE TO RELATED APPLICATIONS

The present application claims priority to U.S. Provisional Patent Application No. 60/056,492, filed Aug. 21, 1997.

FIELD OF THE INVENTION

The present invention relates to filters, and more particularly to canister type filters having a replaceable filter element inside the canister.

BACKGROUND OF THE INVENTION

Most existing oil filters, such as are commonly installed with a residential fuel oil tank, have a top piece that is shaped like a dome and that must be full of fuel for the filter to work. When the bottom filter canister that houses the fuel filter is separated from the top piece to check or change the filter element, all of the fuel that was in the dome spills out over the sides of the filter canister, onto the floor or onto the hands of the service technician or other person changing or checking the filter. Such fuel spillage is undesirable. Exposure to certain fluids is known to be unhealthy. For example, the fluid can undesirably react with human skin. Fuel odors can remain in the basement or other area where the fuel tank is located. Customers can complain, resulting in expensive service call backs. In the worst case, the spilled fuel oil could find its way to a drain or sump hole.

Furthermore, on existing filters, the inlet fitting comes straight in at a 90 degree angle. After the filter element is changed, the canister is full of air that must be removed (on a one-pipe system), or the fuel line will become air bound. Bleeding it out the old way, through the bleed screw, takes time, and can and does result in spilled oil if the filter is left unattended.

Accordingly, it is an object of the present invention to address one or more of the foregoing disadvantages of the prior art.

Other objects will be apparent to one of ordinary skill in light of the following disclosure.

SUMMARY OF THE INVENTION

According to the invention there is provided a filter assembly having a top piece that plunges into the bottom filter canister and takes up space so that when the bottom canister is separated from the top piece, the fuel level in the canister stays below the top, preventing spilling.

Furthermore, the inlet fitting of the top piece can be angled upward, such that almost all of the air in the canister can be quickly bled back into the fuel tank holding the fuel to be filtered by the filter assembly.

The invention thus advantageously provides a filter that can be taken apart to access the filter element with little or no fluid escaping, and/or can reduce the amount of air that must be manually bled from the system serviced by the fuel filter such that the air will not interfere with the flow of liquid.

Accordingly, the process of changing the filter can be simplified reducing the time for cleanup, and saving time and money. The invention can also reduce any health risks posed by exposure to fluids.

All FIGURES are approximately full scale.

DETAILED DESCRIPTION OF THE PREFERRED EMBODIMENTS

Figure 1:
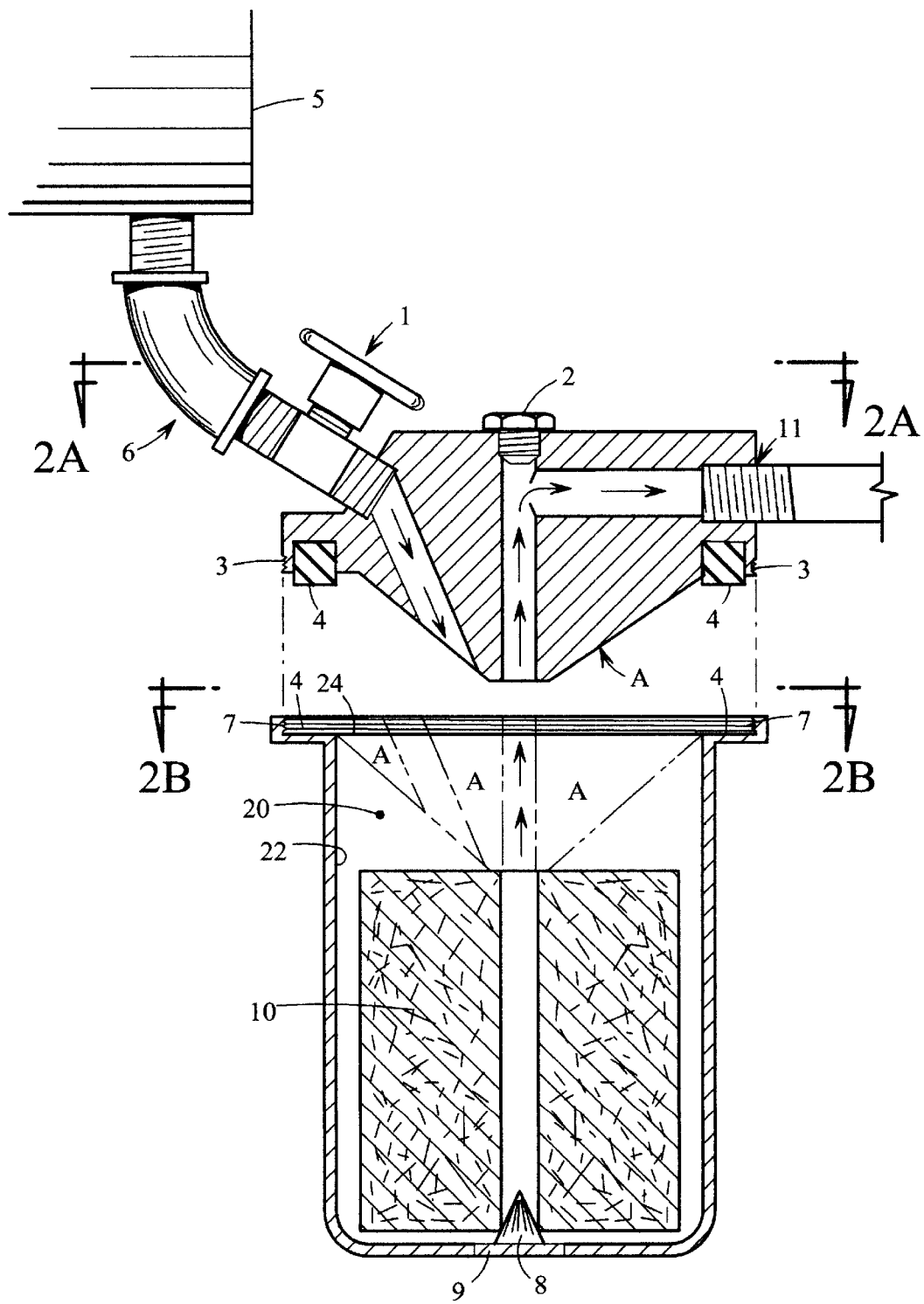
FIG. 1 is a cross sectional view of a no spill, self bleeding filter assembly according to the invention.

FIG. 1 is a cross sectional view of a filter assembly according to the invention and illustrates the following:
1. Fuel shutoff valve.
2. Bleeder screw.
3. Threads for screwing on the bottom canister to the top piece.
4. Contact surface for canister gasket.
5. Oil tank.
6. Pipe, typically black iron or galvanized. The angle of the elbow fitting (6) plus the angle of the inlet fitting should be equal to about 90 degrees, so that the filter assembly is level when installed. As shown in FIG. 1, each of the angles is about 45 degrees.
7. Threads for screwing the bottom canister to the top piece.
8. Center post for correctly positioning the filter element.
9. Bottom ridge for keeping unfiltered liquid from mixing with filtered liquid through the bottom, and helps to position the filter element.
10. conventional filter element.
11. liquid outlet fitting, shown with a pipe screwed into the fitting.

The bottom canister can be joined to the top piece with threads on top outside edge of the bottom canister (which will also help with the no-spill feature), and mating threads on the bottom outside edge of the top piece. Alternatively, if manufacturing costs are too high, the top piece can be joined to the bottom canister the conventional way, with a bolt going down through the middle of the top piece, and mating threads at the bottom (inside) of the filter canister, as indicated by reference numerals 3 and 7.

The shading (lines) in FIG. 1 on the top piece represents metal or plastic. The blank area represents liquid. Arrows represent the flow of liquid. The shading on the bottom piece represents the filter element 10.

The dotted lines at the top of the bottom piece indicate where the cone portion of the top piece plunges into the bottom canister when the two are joined together for regular use as a filter. Top piece and bottom piece are shown apart in FIG. 1.

With reference to FIG. 1, the canister includes an upper volume 20 bounded by the inner walls 22 of the canister and none of the upper volume is occupied by the filter element 10 when received by the canister. Note also that the top piece can include both inlet and outlet passages for communication of liquid with the canister, and that both passages can have openings in the base that is shaped like a cone. The openings can both be below the top 24 of the canister when the canister is joined to the top piece.

Figure 2A:
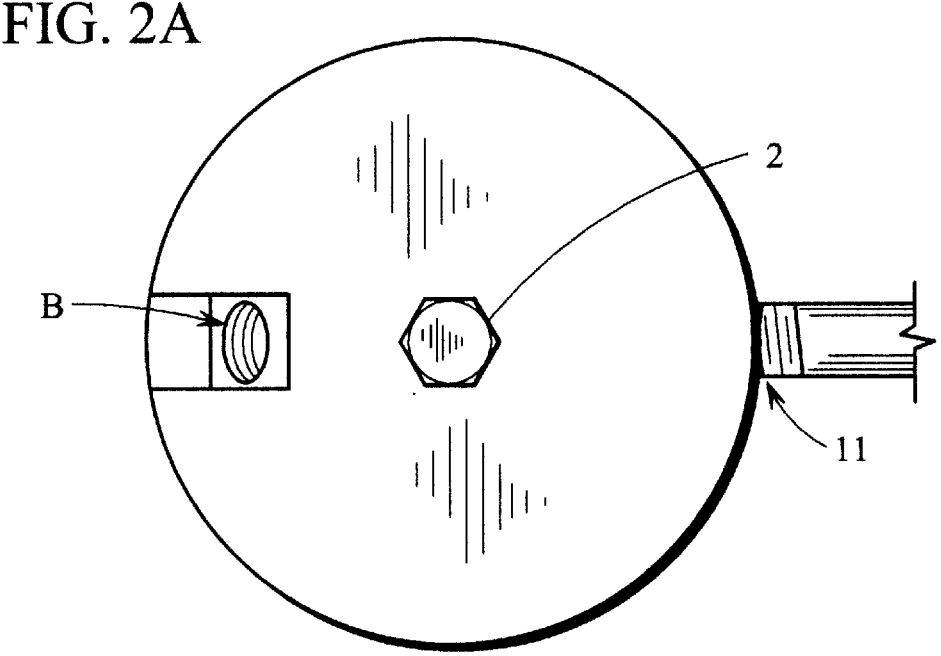
FIG. 2A is a view of the filter assembly of the present invention, taken along section line 2A—2A of FIG. 1.
Figure 2B:
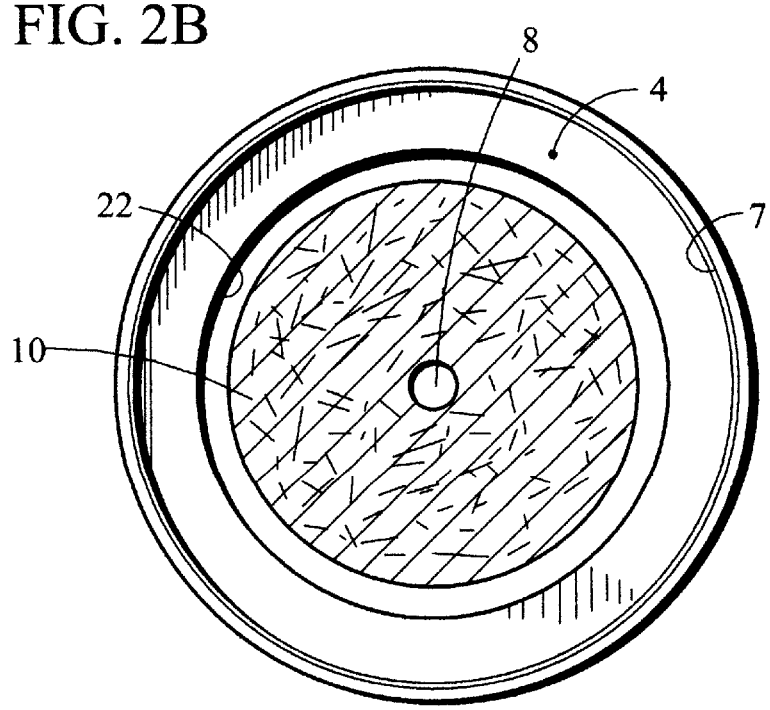
FIG. 2B is a view of the filter assembly of the present invention, taken along section line 2B—2B of FIG. 1.

FIG. 2A is a view taken along line 2A—2A of FIG. 1 and illustrates a top view of the top piece. No adjoining pipes are shown. FIG. 2B is a top view, taken along line 2B—2B of FIG. 1, of the filter canister (lower) with a filter element inside. Shaded area on the filter canister represents the contact surface (or seat) for the canister gasket.

The filter assembly of the present invention is preferably cone shaped at the base of the top piece. The cone shape underneath the top piece plunges into the bottom of the filter canister and takes up space so that when the bottom canister is separated from the top piece, the fuel level in the canister stays below the top, preventing it from spilling. The inlet fitting for the top piece can be angled upward (15 degrees–45 degrees). The advantage of tilting this fitting and the feedpipe slightly upward is that almost all of the air in the canister will quickly bleed back into the fuel tank when the valve (1) is opened.

Typically, practice of the invention will require only two (2) gaskets for reducing leaks. Existing devices can have as many as five (5) gaskets. It is desirable to manufacture the bottom canister as one piece (existing filters can have three pieces) to reduce leaks and manufacturing costs. The filter can be manufactured out of metal (iron, steel, aluminum or aluminum alloy), plastic, or some combination of the two.

The present invention is intended to be useful with liquid type filters that have a permanent type outer housing and a replaceable/cleaner type filter element on the inside. However, the foregoing description is understood to be illustrative and not limiting. For example, although the present invention is intended to be particularly useful with fuel oil filters, especially with indoor or above ground fuel tanks, the improvements represented by the invention should be useful anywhere that there is a liquid filtering canister with a removable or replaceable filter inside.

Having described the invention, what is claimed as new and to be secured by Letters Patent is:

1. A filter assembly for housing a conventional fuel oil filter element for filtering fuel oil, comprising:
   a filter canister for receiving the conventional fuel oil filter element having a central passageway having an opening at one end of the conventional fuel oil filter element;
   a top piece adapted for joining with said canister, said top piece defining inlet and outlet passages for communication of liquid with the canister, said top piece including a base portion shaped to plunge within said canister when said canister is joined to said top piece so as to displace enough liquid that would otherwise fill said canister so as to allow the prevention of spillage of fuel oil when said canister is removed from said top piece;
   one of said passages has a first opening in said base portion, said opening being located with respect to said canister when joined to said top piece for fluidly communicating with the filter element opening, and wherein said inlet passage is upwardly inclined along its entire length for facilitating the removal of air from the filter assembly.

2. The filter assembly of claim 1 wherein said inlet passage is upwardly inclined at an angle of approximately 15 to approximately 45 degrees to the horizontal direction when said filter assembly is installed for filtering for facilitating the removal of air from said filter assembly.

3. A filter assembly for housing a filter element for filtering a liquid such as fuel oil, comprising:
   a filter canister for receiving the filter element;
   a top piece adapted for joining with said canister, said top piece defining inlet and outlet passages for communication of liquid with the canister, said top piece including a base portion shaped to plunge within said canister when said canister is joined to said top piece so as to displace enough liquid that would otherwise fill said canister so as to allow the prevention of spillage of liquid when said canister is removed from said top piece;
   one of said passages having a first opening in said base portion for said communication of liquid by said one passage with the canister, and wherein said canister can receive a cylindrical filter element having a central passageway having an opening at one end of the filter element,
   wherein said first opening in said base is centrally located with respect to said canister when joined to said top piece for fluidly communicating with said filter element opening, and wherein said inlet passage is upwardly inclined along its entire length for facilitating the removal of air from the filter assembly.

4. The filter assembly of claim 3 wherein said canister includes an upper volume bounded by the inner walls of the canister and none of said upper volume is occupied by the filter element when received by said canister and said canister is joined with said base, said upper volume for receiving said base portion.

5. The filter assembly of claim 3 wherein said top piece includes an opening to said other passage for communication by said other passage of liquid with the canister, and wherein said base is shaped to seal the filter element when received by the canister and the canister is joined to the top piece such that fluid passing from one passage to other is filtered by the filter element.

6. The filter assembly of claim 3 wherein said opening is located in the bottom of said base portion.

7. The filter assembly of claim 3 wherein said base portion includes a cone shape and said opening is located at the apex of said cone shape.

8. The filter assembly of claim 3 wherein said inlet passage is upwardly inclined at an angle of approximately 15 to approximately 45 degrees to the horizontal direction when said filter assembly is installed for filtering for facilitating the removal of air from said filter assembly.

9. Apparatus for replaceably mounting a canister having a filter element disposed therein for filtering a liquid such as fuel oil, said apparatus comprising:
   a body for replaceably joining with the canister, said body including inlet and outlet passages in liquid communication with said canister when liquid is present therein and said canister is joined with said body, said body further including a base portion shaped to plunge within said canister when said canister is joined with said body so as displace enough liquid that would otherwise fill said canister so as to allow prevention of spillage of liquid during removal of said canister, said base portion including a cone shape having an opening located at the apex of the cone to one of said passages for said liquid communication of said one passage with the canister.

10. The apparatus of claim 9 wherein said inlet passage is upwardly inclined for facilitating the removal of air from said filter assembly.

11. The apparatus of claim 9 wherein said inlet passage is upwardly inclined at an angle of approximately 15 to approximately 45 degrees to the horizontal direction when said filter assembly is installed for filtering for facilitating the removal of air from said filter assembly.

12. A filter assembly for housing a filter element for filtering a liquid such as fuel oil, comprising:
   a filter canister for receiving the filter element;
   a top piece adapted for joining with the canister, the top piece defining inlet and outlet passages for communication of liquid with the canister, said top piece including a base shaped to plunge within said canister when said canister is joined to said top piece so as to displace enough liquid that would otherwise fill said canister so as to allow the prevention of spillage of liquid when said canister is removed from said top piece;
   one of said passages having a first opening in said base for said communication of liquid by said one passage with the canister, and wherein said canister can receive a cylindrical filter element having a central passageway having an opening at one end of the filter element, and
   said base includes a cone shape and said opening is located at the apex of said cone shape.

* * * * *